United States Patent
Sakaguchi et al.

(10) Patent No.: US 8,497,654 B2
(45) Date of Patent: Jul. 30, 2013

(54) SINGLE PHASE AC SYNCHRONIZED MOTOR

(75) Inventors: Takahiro Sakaguchi, Kitasaku-gun (JP); Masahiro Kobayashi, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 197 days.

(21) Appl. No.: 13/105,480

(22) Filed: May 11, 2011

(65) Prior Publication Data

US 2011/0291605 A1    Dec. 1, 2011

(30) Foreign Application Priority Data

May 31, 2010    (JP) ................................. 2010-124487

(51) Int. Cl.
*H02P 1/46*    (2006.01)
*H02P 6/00*    (2006.01)

(52) U.S. Cl.
USPC ........... 318/709; 318/705; 318/700; 318/706; 318/508; 363/17; 363/21.03

(58) Field of Classification Search
USPC ..... 318/705, 700, 706, 709; 323/221; 363/17, 363/21.03
See application file for complete search history.

(56) References Cited

U.S. PATENT DOCUMENTS

| | | | | |
|---|---|---|---|---|
| 6,424,114 | B1 * | 7/2002 | Komatsu | 318/721 |
| 6,806,666 | B2 * | 10/2004 | Kim et al. | 318/362 |
| 6,895,176 | B2 * | 5/2005 | Archer et al. | 388/825 |
| 7,948,193 | B2 * | 5/2011 | Komatsu et al. | 318/400.01 |

FOREIGN PATENT DOCUMENTS

JP    B1-4030571    1/2008

\* cited by examiner

*Primary Examiner* — Rita Leykin
(74) *Attorney, Agent, or Firm* — Oliff & Berridge, PLC

(57) ABSTRACT

There is provided a single-phase AC synchronized motor that does not need smooth of rectifier waves but stably performs shift from a starting operation to a synchronized operation. In the motor, based on detected signals of a position sensor, rectified current is reciprocally flowed to each direction of a single-phase coil which starts the motor. The motor includes a start-up operation circuit with a sensor starting period that increases a rotational speed until reaching to a first predetermined rotational speed; and a control device that controls operation of the motor as that shift to synchronized operation is performed when a rotational speed of a permanent magnetic rotor is reached to a second predetermined rotational speed nearby a synchronized rotational speed but not exceeding the synchronized rotational speed, and when the rise and fall of detected signals of the position sensor and the zero-cross point of AC current are approximately correspondent to each other.

4 Claims, 6 Drawing Sheets

SINGLE PHASE AC SYNCHRONIZED MOTOR

BACKGROUND OF THE INVENTION

1. Field of the Invention

The present invention relates to a single-phase AC synchronized motor, in particular, to a single-phase AC synchronized motor as that the single-phase AC synchronized motor is adapted to shift to synchronized operation by means of a synchronized operation circuit at the point of time that the rotational speed of a permanent magnet rotor does not exceed a synchronized rotational speed at a starting operation.

2. Description of the Related Art

In conventional single-phase AC synchronized motors, Japanese Patent No. 4030571 (hereinafter referred to as the "Patent Document 1") discloses that a starting operation as a DC brushless motor is performed so as to raise the rotational speed of a rotor up to a synchronized rotation. AC current is then applied to a motor coil for switching over to a synchronized operation as an AC synchronized motor.

The single-phase AC synchronized motor disclosed by the Patent Document 1 comprises: a start-up operation circuit; a synchronized operation circuit that performs a synchronized operation as an AC synchronized motor by applying AC current to a motor coil; an operation selector switch that is provided between a single-phase AC power and the motor coil and that switches over between electric conduction to the start-up operation circuit and electric conduction to the synchronized operation circuit; and a control means that shifts the motor to the synchronized operation by switching over the operation selector switch from the start-up operation circuit to the synchronized operation circuit. Here, in the above start-up operation circuit, AC current supplied from the single-phase AC power is rectified by means of a rectifier bridge circuit; DC current that is smoothed by means of a filter circuit is produced; the direction of motor current is switched over by switching a switching means for start by means of detecting signals from a detecting sensor that detects the position of magnetic poles of a permanent magnet rotor; and a motor coil connected to the single-phase AC power is then electrically conducted. Accordingly, the start-up operation circuit can perform a start-up operation as a DC brushless motor.

Further, while controlling the operation selector switch to be as that the single-phase AC power is connected to the start-up operation circuit, the control means starts the motor through a switching control over a switching means for start according to the detecting signals of the detecting sensor. When the rotational speed of the permanent magnet rotor reaches to a predetermined rotational speed nearby a synchronized rotational speed, a motor current waveform where its phase is more delayed than the output waveform of the detecting sensor is made as that an electrification direction is switched over at least at the zero-cross point of the sensor output waveform. Accordingly, since the motor starts and drives while reducing the electrified range of the motor current, the rotational speed of the rotor can be increased up to the synchronized rotational speed while reducing the occurrence of reverse running torque at the starting operation thereby being stably led to synchronization.

However, the single-phase AC synchronized motor disclosed in the Patent Document 1 has the following problems. First, in the single-phase AC synchronized motor, since start and acceleration are performed by a single-phase full-wave drive through a sensor, a phase becomes detectable after exceeding an AC synchronized rotational speed, subsequently switching over to AC synchronized operation. In this method, there is a case that the switch-over operation becomes unstable depending on motors or the operation environments of the motors. Second, in this single-phase AC synchronized motor, since a rectifier wave is smoothed, it makes necessary to have a large and a high-capacity smoothing capacitor. Because excessive current of more than 5 A is flowed from a bridge diode to the smoothing capacitor, it becomes prerequisite to choose large-sized diodes.

SUMMARY OF THE INVENTION

The present invention has been made in light of the above problem, and it is an object of the present invention to provide a single-phase AC synchronized motor that does not need to smooth rectifier waves and that can perform stable switch-over from a starting operation to a synchronized operation.

Embodiments according to the present invention hereinbelow exemplify some structures of the present invention, and are itemized for facilitating understanding of various structures of the present invention. Each item does not intend to limit the technical scope of the present invention. While considering the best modes to carry out the present invention, even if components of each item is partially substituted or deleted, or even if another component is added thereto, these should be regarded as the elements of the technical scope of the present invention.

In order to achieve the object described above, according to a first aspect of the present invention, there is provided a single-phase AC synchronized motor comprising: a permanent magnet rotor placed in a housing and arranged rotatably round an output shaft of the motor; a stator including an armature coil where a single-phase coil is wound around a stator core; a rectifier circuit that rectifies AC current supplied from an AC power; first and second operation selector switches that are connected between the rectifier circuit and each end of the single-phase coil so as to make rectified current that has been rectified by means of the rectifier circuit flowed toward the armature coil; first and second switching elements that are respectively connected to the first and second operation selector switches in series; a start-up operation circuit that performs a starting operation as a DC brushless motor with a sensor starting period, the sensor starting period reciprocally turning ON and OFF between a pair of the first operation selector switch and the second switching element and a pair of the second operation selector switch and the first switching element based on detected signals from a position sensor which detects a position of a magnetic pole so as to reciprocally change over a direction of the rectified current flowed in the single-phase coil for raising rotational speed of the permanent magnet rotor until reaching to a first predetermined rotational speed; third and fourth operation selector switches that are connected between the AC power and each end of the single-phase coil; a synchronized operation circuit where the rectified current from the rectified circuit is cut of when the first and second operation selector switches and the first and second switching elements are turned OFF, the single-phase coil is connected in series relative to the AC power when the third and fourth operation selector switches are turned ON, and a synchronized operation as an AC synchronized motor is performed when the AC current is applied to the single-phase coil; and a control device to control that a starting operation by means of the start-up operation circuit is adapted to shift a synchronized operation by means of the synchronized operation circuit when the rotational speed of the permanent magnet rotor does not exceed its synchronized rotational speed but reaches to a second predetermined rotational speed nearby the synchronized rotational speed, and when rise or fall of the detected signals of the position sensor and a zero-cross point of the AC current are approximately correspondent to each other.

The single-phase AC synchronized motor of the above includes the control device so that stable shift to the synchronized operation becomes possible. Here, in the control device, at the starting operation, the rotational speed of the permanent magnet rotor does not exceed the synchronized rotational speed but reaches to the second predetermined rotational speed nearby the synchronized rotational speed. When the rise-time or the fall-time of detecting signals of the position sensor and the zero-cross point of AC current approximately meet each other, shift to synchronized operation is performed by means of the synchronized operation circuit.

In the first aspect of the present invention, a pulse operation period is provided following the sensor starting period at the starting operation, the pulse operation period being performed as that: 1) the ON and OFF operation based on the detected signals from the position sensor is suspended; 2) not based on the detected signals from the position sensor but based on a predetermined control signal output from the control device, a pair of the first operation selector switch and the second switching element and a pair of the second operation selector switch and the first switching element are adapted to reciprocally turn ON and OFF; and 3) based on pulse current flowed in the single-phase coil, a rotational speed is raised up to the second predetermined rotational speed without exceeding the synchronized rotational speed.

In the single-phase AC synchronized motor of the above, at the starting operation, since the pulse operation period discussed hereinabove is provided following the sensor starting period, the rotational speed is gradually raised up to the second predetermined rotational speed while not exceeding the synchronized rotational speed, contributing to stable operation.

In the first aspect of the present invention, a predetermined idle running period is provided at start of the synchronized operation.

In the single-phase AC synchronized motor of the above, since the predetermined idle-running period is provided between the starting operation and the synchronized period, it makes possible that the third and the fourth operation selector switches can be ON after the first and the second operation selector switches and the first and the second switching elements are surely OFF. Accordingly, it would be possible to prevent flow of overcurrent due to the short of circuit so as to inhibit the damage of the elements.

In the first aspect of the present invention, the predetermined idle running period is correspondent to n times of a half-wave of the AC current where n is one of the integers.

Since the single-phase AC synchronized motor according to the present invention is structured as discussed hereinabove, smoothing of the rectifier wave will be not necessary at the starting operation. Furthermore, the switching operation from the starting operation to the synchronized operation can be stably performed without depending on motors, or the operation environments of the motors.

BRIEF DESCRIPTION OF THE DRAWINGS

FIG. 5 shows the drive circuit of the single-phase AC synchronized motor according to one embodiment of the present invention where

DETAILED DESCRIPTION OF THE PREFERRED EMBODIMENTS (Motor Structure)

Preferred embodiments of the present invention will be described with reference to the accompanying drawings.

Figure 1:
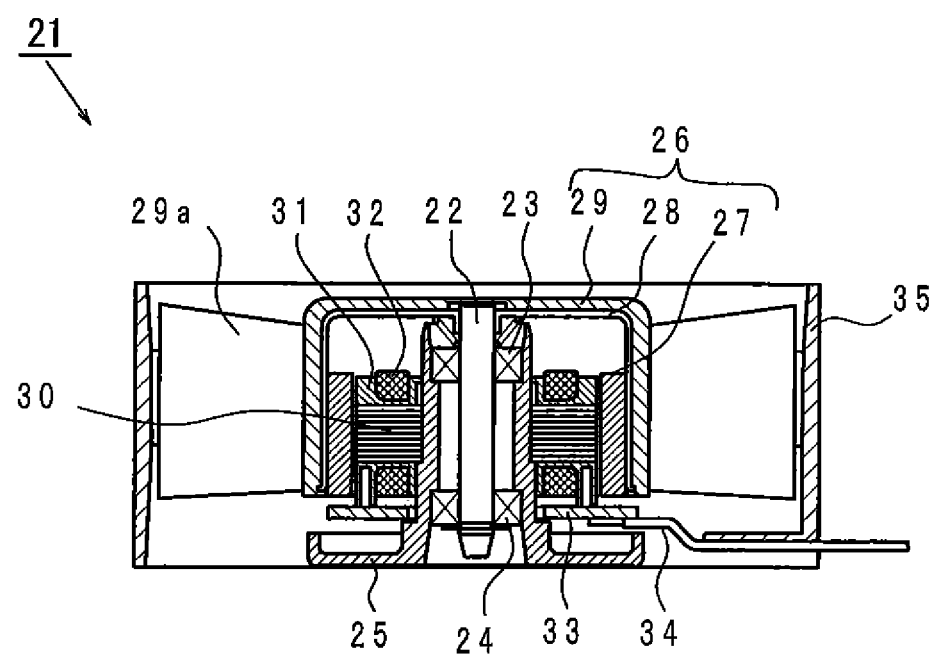
FIG. 1 is an axial sectional view that explains the structure of a single-phase AC synchronized motor according to one embodiment of the present invention.

FIG. 1 is an axial sectional view that schematically shows a motor to which a drive circuit according to the present invention is installed. In FIG. 1, a motor 21 is shown. The motor 21 is an AC fan motor shown as one example of a single-phase AC motor, the motor 21 being provided with a shaft 22 working as a rotary shaft. The shaft 22 is supported by a bearing 23 and a bearing 24. The bearing 23 is installed at the bottom portion of a lower housing 25 while the bearing 24 is installed at the lower housing 25. With this structure, the shaft 22 is installed so as to be rotatable relative to the lower housing 25. Further, the shaft 22 is provided with a permanent magnet rotor 26. The permanent magnet rotor 26 comprises: a rotor yoke 28 where a permanent magnet 27 magnetized by a plurality of magnetic poles is fixed on the inner periphery of the rotor yoke 28; and an impeller 29 that has a plurality of blades 29a and that is fixed on the outer periphery of the rotor yoke 28.

A stator core 30 is arranged in such a manner as to face the permanent magnet rotor 26 in a radial direction. The stator core 30 is made from magnetic materials such as silicon steel, etc. and is fixed to the lower housing 25. The stator core 30 is provided with salient poles correspondent to the number of the magnetic poles. The plurality of salient poles are arranged in such a manner as to be surrounded by the permanent magnet rotor 26. In the motor 21, its rotational direction is determined as that the permanent magnet rotor 26 is fixed in such a manner as that the stable point thereof is deviated in the rotational direction. Since this is the same with general DC fan motors, detail explanation thereof is omitted.

The stator core 30 comprises: an insulator member 31 that partially covers the stator core 30; and an armature coil 32 that is wound around the insulator member 31. The end portion of the armature coil 32 is connected with a drive circuit board 33, and an external connection line 34 connected to the drive circuit board 33 is drawn to outside of a housing through a line port provided at a housing main body 35 that surrounds the impeller 29.

(Drive Circuit Structure)

Figure 2:
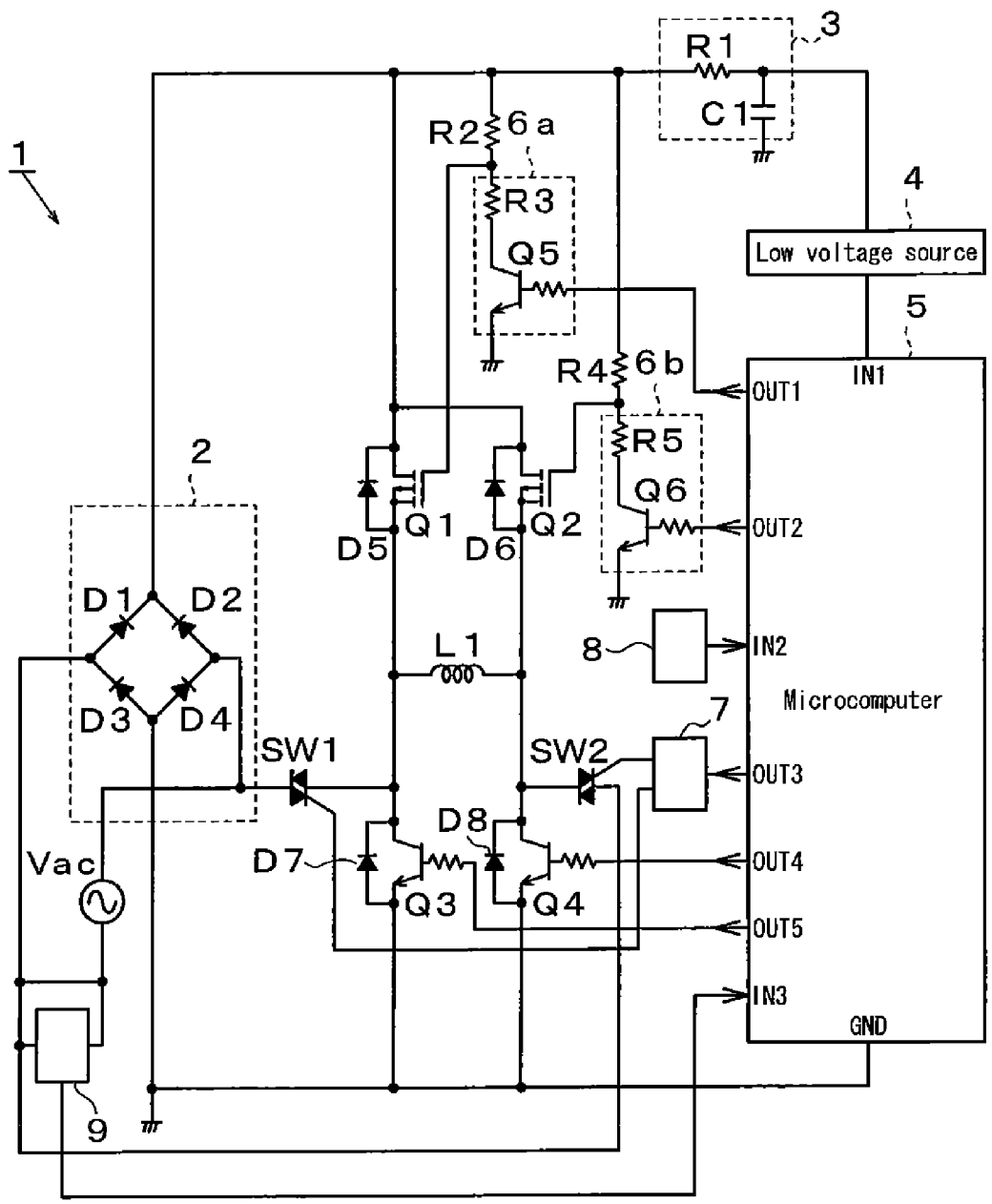
FIG. 2 is a block diagram that shows the drive circuit of the single-phase AC synchronized motor according to one embodiment of the present invention.

Next, the drive method of the above-described single-phase AC synchronized motor according to the embodiment of the present invention will be explained. FIG. 2 shows one example of preferable drive circuits for performing the drive method. A drive circuit 1 shown in FIG. 2 comprises: a rectifier circuit 2 that rectifies AC current supplied from an AC power Vac; first and second operation selector switches Q1, Q2 that are connected between the rectifier circuit 2 and both ends of a single-phase coil L1 and that flow the current rectified by the rectifier circuit 2 to the single coil L1 being composed of the armature coil 32; and a control device (microcomputer) 5. Here, the rectifier circuit 2 is a full-wave rectifier circuit being composed of a diode bridge circuit with diodes D1 to D4. The first and second operation selector switches Q1, Q2 are composed of the switching elements of MOSFET, and diodes D5, D6 are connected between a drain terminal and a gate terminal of MOSFET. These diodes D5, D6 may be applied by the parasitic diode of the switching elements Q1, Q2 or an external rectifier element.

Between the rectifier circuit 2 and a microcomputer 5, there is provided: a filter circuit 3 that smoothes rectifier current output from the rectifier circuit 2 so as to produce DC current; and a low voltage source 4 where DC current output from the filter circuit 3 is input so as to supply predetermined DC voltages to the input terminal IN1 of the microcomputer 5. The filter circuit 3 is, as shown in FIG. 2, composed of a resistor R1 and a capacitor C1 that are connected in series, and one end of the capacitor C1 is connected to GND. Here, since the capacitor C1 is arranged at the later step of the resistor R1 that works for smoothing, a small capacity and a long operating life capacitor (a film capacitor) can be used.

The gate terminal of MOSFET that is composed of the first and second operation selector switches Q1, Q2 are respectively connected with switch drive circuits 6a, 6b. The switch drive circuit 6a is composed of a resistor R3 and a switching element Q5. In the switching element Q5, its base terminal is connected with the output terminal OUT1 of the microcomputer 5 through a resistance element, and its collector terminal is connected with the gate terminal of MOSFET composed of the first operation selector switch Q1 through a resistor R3. As the same, a switch drive circuit 6b is composed of a resistor R5 and a switching element Q6. In the switching element Q6, its base terminal is connected with the output terminal OUT 2 of the microcomputer 5 through a resistance element, and its collector terminal is connected with the gate terminal of MOSFET composed of the second operation selector switch Q2 through the resistor R5. The switch drive circuits 6a, 6b output the switching signals of ON and OFF operations to the first and second operation selector switches Q1, Q2 based on control signals from the output terminals OUT1, OUT 2 of the microcomputer 5. The switch drive circuits 6a, 6b are arranged between the first, second operation selector switches Q1, Q2 and the microcomputer 5, so that they work to prevent the large amount of rectifier current flowing to the first and second operation selector switches Q1, Q2 from flowing to the microcomputer 5.

The drive circuit 1 further comprises first and second switching elements Q3, Q4 that are respectively connected in series with the first and second operation selector switches Q1, Q2. The first switching element Q3 and the second switching element Q4 are each structured by a bipolar transistor, and diodes D7 and D8 are each connected between an emitter terminal and a collector terminal. The base terminal of the first switching element Q3 is connected with the output terminal OUT 5 of the microcomputer 5 through a resistance element while the base terminal of the second switching element Q4 is connected with the output terminal OUT 4 of the microcomputer 5 through a resistance element. Further, between a connecting point (defined between the single-phase coil L1 and the first operation selector switch Q1) and one end of the AC power Vac, a third operation selector switch SW1 of triac is arranged. The other end of the AC power Vac is connected with one end of a fourth operation selector switch SW2 of triac while the other end of the fourth operation selector switch SW2 is connected with a connecting point between the single-phase coil L1 and the second operation selector switch Q2. Each gate terminal of the third operation selector switch SW1 and the fourth operation selector switch SW2 is connected with the output terminal OUT 3 of the microcomputer 5 through a triacgate voltage generating circuit 7. This triacgate voltage generating circuit 7 will produce gate voltages necessary for operating the third operation selector switch SW1 and the fourth operation selector switch SW2 according to command from the microcomputer 5.

Further, the drive circuit 1 includes a position sensor (for example, a hall IC) 8 for detecting the position of the magnetic pole of the permanent magnet rotor 26, and the output of the position sensor 8 is connected with the input terminal IN 2 of the microcomputer 5. Still further, an AC zero-cross detection circuit (for example, photocoupler) 9 is connected in parallel with an AC power Vac line, and the output of the AC zero-cross detection circuit 9 is connected with the input terminal IN 3 of the microcomputer 5.

Figure 3:
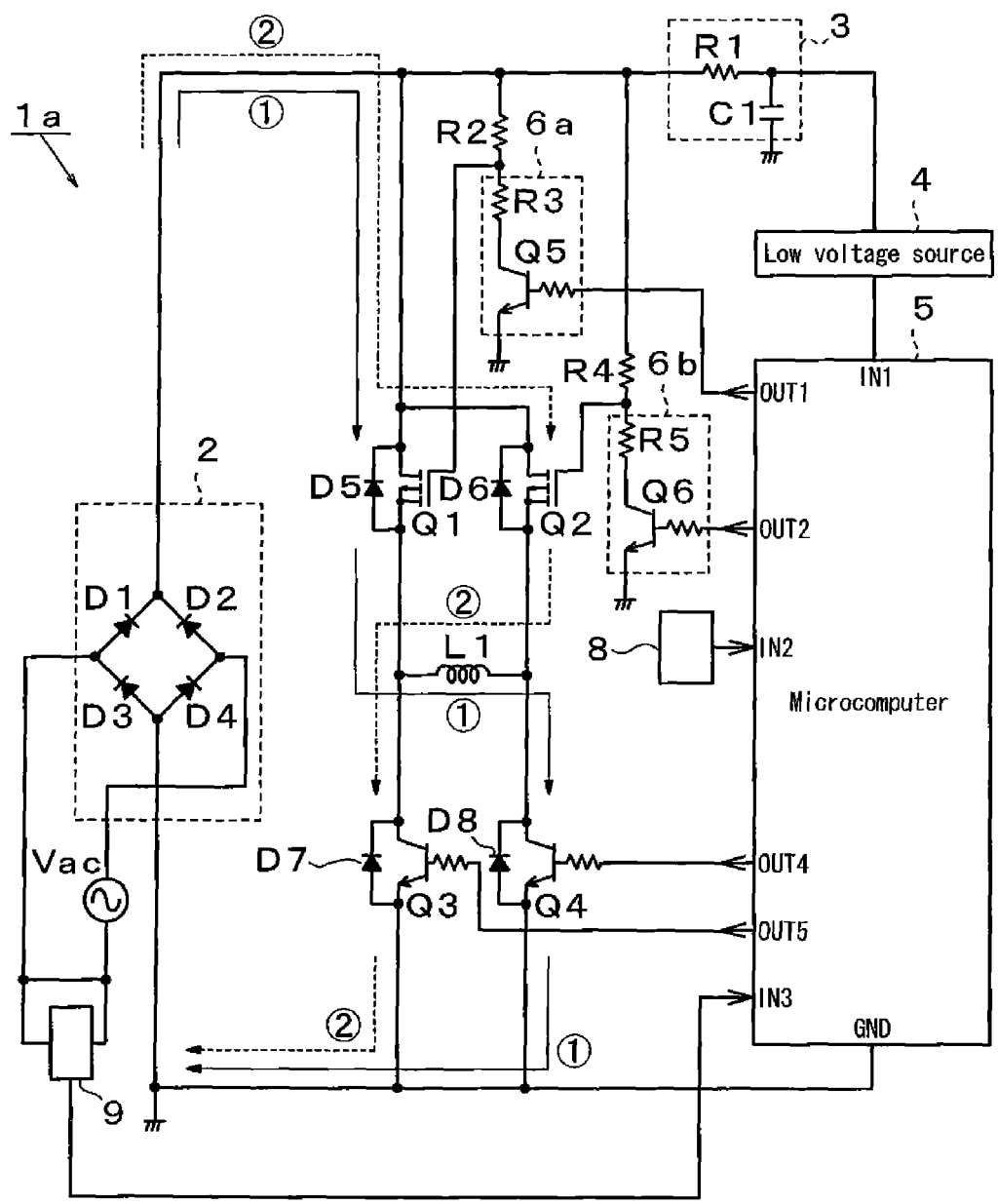
FIG. 3 is a block diagram that explains the operation of a start-up operation circuit of the single-phase AC synchronized motor according to one embodiment of the present invention.
Figure 4:
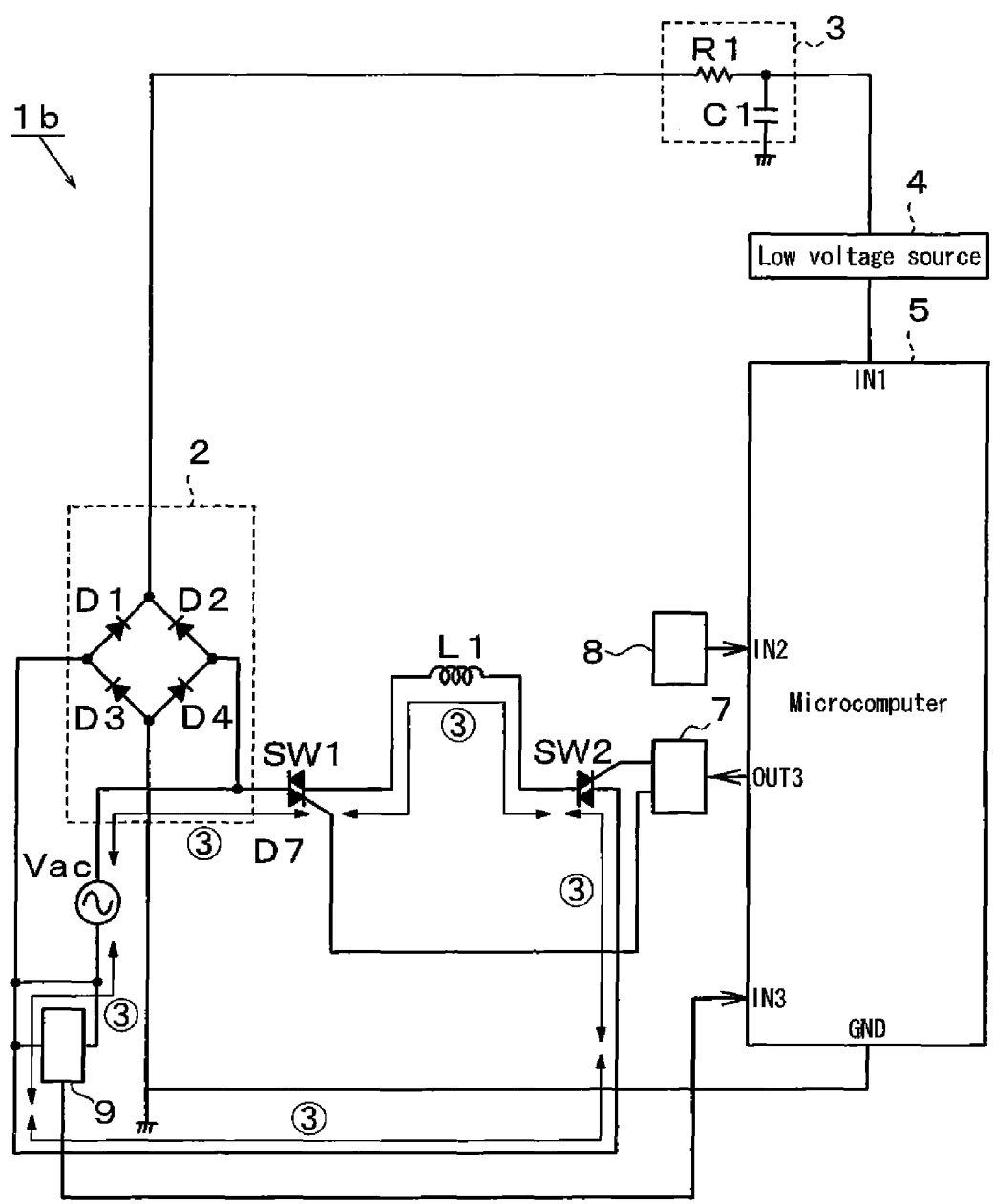
FIG. 4 is a block diagram that explains the operation of a synchronized operation circuit of the single-phase AC synchronized motor according to one embodiment of the present invention.
Figure 5A:
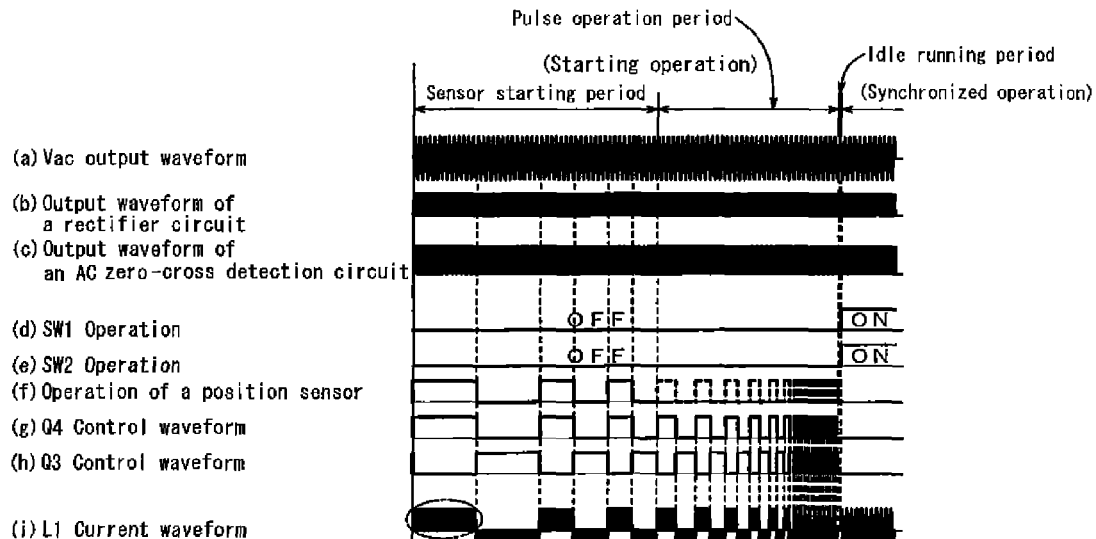
FIG. 5A is a timing chart that shows a starting operation (a sensor starting period and a pulse operation period) and the output waveforms of the main portion of the drive circuit in a synchronized operation.
Figure 5B:
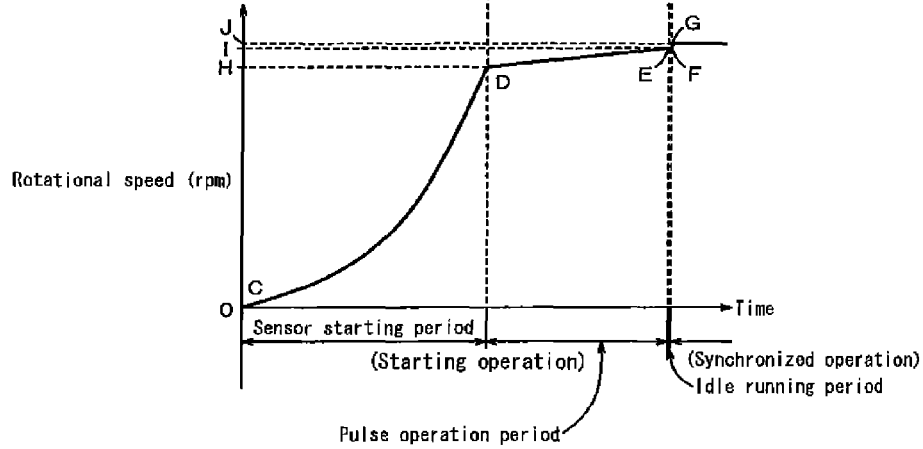
FIG. 5B is a graph that shows a relation between a drive period and the rotational speed of a motor.
Figure 6:
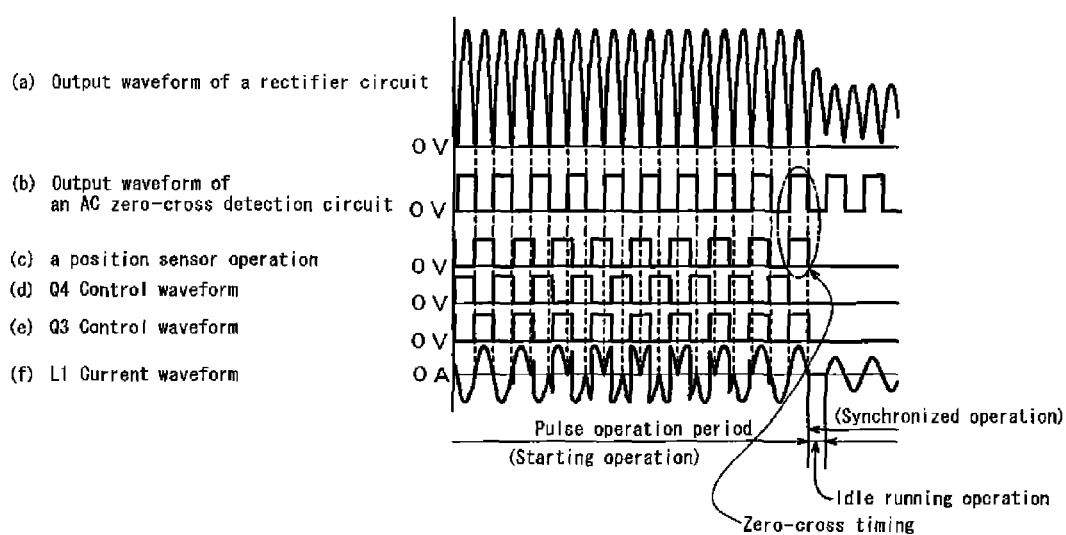
FIG. 6 is a timing chart in the drive circuit of the single-phase AC synchronized motor according to one embodiment of the present invention where the output waveforms of a main portion of the drive circuit when being shifted from a pulse operation period to a synchronized operation period are shown in detail.

Next, one example of the starting operation and the synchronized running operation of the drive circuit 1 will be explained with reference to FIGS. FIG. 3 is a block diagram that explains the operation of a start-up operation circuit 1a during a starting operation period of the drive circuit 1. FIG. 4 is a block diagram that explains the operation of a synchronized operation circuit 1b during a synchronized operation of the drive circuit 1. FIG. 5A is a timing chart that shows a starting operation (a sensor starting period and a pulse operation period) and the output waveforms of a main portion of the drive circuit 1 in synchronized operation. FIG. 5B is a graph that shows a relation between a driving period and the rotational speed of a motor. FIG. 6 is a timing chart that shows in detail the output waveform of the main portion of the drive circuit 1 at the time shifting from a pulse operation period to a synchronized operation period.

(Starting Operation Period)

First, the operation of the driving operation circuit 1a will be explained. As shown in FIG. 3, the AC current of the AC power Vac is rectified through the rectifier circuit 2. The rectified current is smoothed by passing through the filter circuit 3. The smoothed DC current is then input into the low voltage source 4. Predetermined DC voltages from the low voltage source 4 are applied to the microcomputer 5 as a drive voltage. That is, the drive voltage of the microcomputer 5 uses the predetermined voltage that is depressed by the low voltage source 4 after the AC current of the AC power Vac is rectified and smoothed. Thus, it becomes not necessary to introduce the drive voltage from an external DC power to the microcomputer 5 contributing to simplification of the circuit.

At the starting operation period, since the output signal of the output terminal OUT 3 of the microcomputer 5 becomes a Low level, the third operation selector switch SW1 and the fourth operation selector switch SW2 each become an OFF condition. See (d) and (e) in FIG. 5A.

(Starting Operation Period: Sensor Starting Period)

A starting operation period starts from a sensor starting period. During this period, based on detecting signals from the position sensor 8 according to the position of the magnetic pole of the permanent magnet rotor 26 (see (f) of FIG. 5A), a motor is driven by performing general single-phase full-wave drives. The rotational speed of the motor can be thus raised relatively in a rapid manner up to a first predetermined rotational speed H. See the region defined by C-D in FIG. 5B.

At the sensor starting period, the frequency of the voltage input from the AC power Vac (50 Hz or 60 Hz) is detected at the AC zero-cross detection circuit 9. Based on the detected result, a targeted synchronized rotational speed J will be determined. A first predetermined rotational speed H (for example, 50 to 80% of the synchronized rotational speed J) will be then determined based on the synchronized rotational speed J. Based on high level signals output from the output terminal OUT 1 of the microcomputer 5 through a switch drive circuit 6a, the first operation selector switch Q1 is turned ON. At the same time, based on high level signals output from the output terminal OUT 4 of the microcomputer 5, the second switching element Q4 is turned ON. AC current of the AC power Vac (see (a) of FIG. 5A) is then passed through the rectifier circuit 2 so as to achieve rectified current (see (c) of FIG. 5A). Accordingly, a current pathway making the rectified current flowed in a single direction of the single-phase coil L1 is formed. See ① in FIG. 3.

Further, based on high level signals output from the output terminal OUT 2 of the microcomputer 5 through a switch drive circuit 6b, the second operation selector switch Q2 is turned ON. At the same time, based on high level signals output from the output terminal OUT 5 of the microcomputer 5, the first switching element Q3 is turned ON. AC current of the AC power Vac is passed through the rectifier circuit 2 so as to obtain rectified current. Accordingly, a current pathway making the rectified current flowed in a reverse direction of the single-phase coil L1 is formed. See ② in FIG. 3.

Furthermore, from the output terminals OUT 1, OUT 4 and the output terminals OUT 2, OUT 5 of the microcomputer 5, high level signals are reciprocally output according to detected signals from the position sensor 8. Thus, a pair of the first operation selector switch Q1 and the second switching element Q4 and a pair of the second operation selector switch Q2 and the first switching element Q3 are reciprocally turned ON. See (g) and (h) of FIG. 5A. Each direction of the single-phase coil L1 is reciprocally electrified so as to drive the motor 21 as a DC brushless motor. Here, time taken for electrifying each direction of the single-phase coil L1 is controlled by the microcomputer 5 so as to be gradually shortened in proportion to a number of the electrification according to detected signals from the position sensor 8. The rotational speed of the permanent magnet rotor 26 is thus increased.

At the sensor starting period, when the rotational speed of the permanent magnet rotor 26 is raised and reached to a first predetermined rotational speed H, a motor is shifted to a pulse operation. Here, it would be preferable that the first predetermined rotational speed H being shifted from the sensor starting period to a pulse operation period is set to the rotational speed of when vibration of the motor 21 due to a mechanical natural frequency is reduced.

(Stating Operation Period: Pulse Operation Period)

At the pulse operation period, the ON and OFF operation of the first and second operation selector switches Q1, Q2 and the first and second switching elements Q3, Q4 based on the detected signals from the position sensor 8 is suspended. Then, a pair of the first operation selector switch Q1 and the second switching element Q4 and a pair of the second operation selector switch Q2 and the first switching element Q3 reciprocally turn ON and OFF by means of predetermined control signals output from the output terminals OUT 1, OUT 2, OUT 4 and OUT 5 of the microcomputer 5. Subsequently, pulse current is applied to the single-phase coil L1, so that the rotational speed of a motor is raised relatively in a gradual manner up to a second predetermined rotational speed I. See D-E of FIG. 5B.

Here, the second predetermined rotational speed I is determined, based on a targeted synchronized rotational speed J, as a value nearby its synchronized rotational speed but not exceeding the synchronized rotational speed (for example, 90 to 95% of the synchronized rotational speed). The predetermined control signals described hereinabove will be determined not based on the detected signals from the position sensor 8, but based on variable parameters in connection with the operation of the motor 21 (for example, the first predetermined rotational speed H, the second predetermined rotational speed I, the pulse operation period, etc.).

At the pulse operation period, when the rotational speed of the permanent magnet rotor 26 is raised and reached to the second predetermined rotational speed J, the motor is shifted to an idle running period. The performance of this shift will be explained hereinbelow in detail. At the pulse operation period, after the rotational speed of the permanent magnet rotor 26 is reached to the second predetermined rotational speed J, due to pulsating current applied for a drive, waveform destruction periodically occurs in current flowed in the single-phase coil L1 causing a condition that an acceleration mode and a deceleration mode are repeated. See FIG. 6. In the drive circuit 1 (1a), the zero-cross point of the AC power Vac is detected by means of the AC zero-cross detection circuit 9. After a motor is shifted to the acceleration mode, at the timing where the rise or fall of the detected signals of the position sensor 8 and the zero-cross point of the AC power Vac are approximately correspondent to each other (see a surrounded area indicating the zero-cross timing in FIG. 6), signals output from the output terminals OUT 1, OUT 2, OUT 4 and OUT 5 of the microcomputer 5 are to be switched over from the high level to the low level. Accordingly, the first and second operation selector switches Q1, Q2 and the first and second switching elements Q3, Q4 are turned OFF, so that the application of the pulsating current to the single-phase coil L1 is cut off making a motor shifted to the synchronized operation period.

(Synchronized Operation Period: Idle Running Period)

In the embodiments of the present invention, at the start of the synchronized operation period, the idle running period that is correspondent with the half-wave of AC current supplied from the AC power Vac is provided (E-F of FIG. 5B, and FIG. 6). At the idle running period, the first and second operation selector switches Q1, Q2, the first and second switching elements Q3, Q4, and the third and fourth operation selector switches SW1, SW2 are all OFF. Here, it would be sufficient that the idle running period has n times of the half-wave of the AC current (n=integers).

(Synchronized Operation Period: Operations after Idle Running)

Next, the circuit operation of the synchronized operation circuit 1b in the synchronized operation following the idle running period will be explained. In the synchronized operation, as shown in FIG. 4, the output signals of the output terminal OUT 3 of the microcomputer 5 is switched over from a low level to a high level, so that high level signals will be applied to each gate terminal of the third operation selector switch SW 1 and the fourth operation selector switch SW 2 through a triac gate voltage formation circuit 7. Then, the third operation selector switch SW 1 and the fourth operation selector switch SW 2 are both turned ON. Since the first and second operation selector switches Q1, Q2 and the first and second switching elements Q3, Q4 are all kept in OFF while maintaining the idle running condition, rectified current from the rectified circuit 2 will not flow to the single-phase coil L1.

Accordingly, one end of the single-phase coil L1 is connected to one end of the AC power Vac through the third operation selector switch SW1 while the other end of the single-phase coil L1 is connected to the other end of the AC power Vac through the fourth operation selector switch SW2. AC current supplied from the AC power Vac is flowed to the single-phase coil L1. See a route indicated by an arrow with ③ in FIG. 4. Accordingly, the motor 21 will start synchronized operations with the predetermined synchronized rotational speed J as the single-phase AC synchronized motor (see an area posterior to G in FIG. 5B).

As discussed hereinabove, in the drive circuit 1, at the start operation period, since it is designed as that unsmoothed rectified current (pulsating current) flows into the single-phase coil L1, the diodes D1 to D4 of the rectifier circuit 2 will need low-rated diodes. Further, since a large-capacity smoothing capacitor becomes not necessary, the cost of parts can be reduced.

At the sensor starting period, since the motor 21 is driven based on the detected signals from the position sensor 8, it would be possible to prevent vibration or sounds due to mechanical natural vibration of the motor 21 while stably increasing rotational speed in an accelerating manner. Further, in the pulse operation period, since a rotational speed is gradually raised up to the second predetermined rotational speed I nearby the synchronized rotational speed J but not exceeding the synchronized rotational speed, shift from the starting operation to the synchronized operation will not be unstable depending on motors or their operation environments. Still further, since the shift to the synchronized operation is performed at the zero-cross timing of AC current, a motor can be stably shifted to the synchronized operation.

Since the idle running period is provided at the start of the synchronized operation period, after the first and second operation selector switches Q1, Q2 and the first and second switching elements Q3, Q4 are certainly turned OFF, the third and fourth operation selector switches SW1, SW2 are turned ON. Accordingly, it would be possible to prevent the flow of excess current due to short circuit thereby inhibiting destruction of elements.

Hereinabove, the present invention has been discussed based on the preferable embodiments, but the present invention is not limited thereto. For example, the position sensor 8 is not limited to the hall IC but may be replaced by a hall element or photo-sensor. The AC zero-cross detection circuit 9 is not limited to the photocoupler, but a voltage detection circuit is directly constructible. The first and second operation selector switches Q1, Q2 are not limited to MOSFET, but may be a bipolar transistor. The first and second switching elements Q3, Q4 are not limited to the bipolar transistor, but may be FET such as MOSFET and the like. The third, fourth operation selector switches SW1, SW2 are not limited to the triac, but may be optionally applied with an appropriate bidirectional element such as a relay switch. The control device is not limited to the microcomputer 5, but may be a programmable device such as DSP or FPGA.

What is claimed is:

1. A single-phase AC synchronized motor comprising:
a permanent magnet rotor placed in a housing and arranged rotatably round an output shaft of the motor;
a stator including an armature coil where a single-phase coil is wound around a stator core;
a rectifier circuit that rectifies AC current supplied from an AC power;
first and second operation selector switches that are connected between the rectifier circuit and each end of the single-phase coil so as to make rectified current that has been rectified by means of the rectifier circuit flowed toward the armature coil;
first and second switching elements that are respectively connected to the first and second operation selector switches in series;
a start-up operation circuit that performs a starting operation as a DC brushless motor with a sensor starting period. the sensor starting period reciprocally turning ON and OFF between a pair of the first operation selector switch and the second switching element and a pair of the second operation selector switch and the first switching element based on detected signals from a position sensor which detects a position of a magnetic pole so as to reciprocally change over a direction of the rectified current flowed in the single-phase coil for raising rotational speed of the permanent magnet rotor until reaching to a first predetermined rotational speed;
third and fourth operation selector switches that are connected between the AC power and each end of the single-phase coil;
a synchronized operation circuit where the rectified current from the rectified circuit is cut off when the first and second operation selector switches and the first and second switching elements are turned OFF, the single-phase coil is connected in series relative to the AC power when the third and fourth operation selector switches are turned ON, and a synchronized operation as an AC synchronized motor is performed when the AC current is applied to the single-phase coil; and
a control device to control that a starting operation by means of the start-up operation circuit is adapted to shift to a synchronized operation by means of the synchronized operation circuit when the rotational speed of the permanent magnet rotor does not exceed its synchronized rotational speed but reaches to a second predetermined rotational speed nearby the synchronized rotational speed. and when rise or fall of the detected signals of the position sensor and a zero-cross point of the AC current are approximately correspondent to each other,
wherein a pulse operation period is provided following the sensor starting period at the starting operation, the pulse operation period being performed as that:
1) the ON and OFF operation based on the detected signals from the position sensor is suspended;
2) not based on the detected signals from the position sensor but based on a predetermined control signal output from the control device, a pair of the first operation selector switch and the second switching element and a pair of the second operation selector switch and the first switching element are adapted to reciprocally turn ON and OFF; and
3) based on pulse current flowed in the single-phase coil, a rotational speed of the motor is raised up to the second predetermined rotational speed without exceeding the synchronized rotational speed.

2. A single-phase AC synchronized motor comprising:
a permanent magnet rotor placed in a housing and arranged rotatably round an output shaft of the motor;
a stator including an armature coil where a single-phase coil is wound around a stator core;

a rectifier circuit that rectifies AC current supplied from an AC power;

first and second operation selector switches that are connected between the rectifier circuit and each end of the single-phase coil so as to make rectified current that has been rectified by means of the rectifier circuit flowed toward the armature coil;

first and second switching elements that are respectively connected to the first and second operation selector switches in series:

a start-up operation circuit that performs a starting operation as a DC brushless motor with a sensor starting period, the sensor starting period reciprocally turning ON and OFF between a pair of the first operation selector switch and the second switching element and a pair of the second operation selector switch and the first switching element based on detected signals from a position sensor which detects a position of a magnetic pole so as to reciprocally change over a direction of the rectified current flowed in the single-phase coil for raising rotational speed of the permanent magnet rotor until reaching to a first predetermined rotational speed;

third and fourth operation selector switches that are connected between the AC power and each end of the single-phase coil;

a synchronized operation circuit where the rectified current from the rectified circuit is cut off when the first and second operation selector switches and the first and second switching elements are turned OFF, the single-phase coil is connected in series relative to the AC power when the third and fourth operation selector switches are turned ON, and a synchronized operation as an AC synchronized motor is performed when the AC current is applied to the single-phase coil; and a control device to control that a starting operation by means of the start-up operation circuit is adapted to shift to a synchronized operation by means of the synchronized operation circuit when the rotational speed of the permanent magnet rotor does not exceed its synchronized rotational speed but reaches to a second predetermined rotational speed nearby the synchronized rotational speed, and when rise or fall of the detected signals of the position sensor and a zero-cross point of the AC current are approximately correspondent to each other, wherein a predetermined idle running period is provided at start of the synchronized operation.

3. The single-phase AC synchronized motor according to claim 2, wherein the predetermined idle running period is correspondent to n times of a half-wave of the AC current where n is one of the integers.

4. The single-phase AC synchronized motor according to claim 1, wherein a predetermined idle running period is provided at start of the synchronized operation.

* * * * *